US011733518B2

(12) United States Patent
Poore et al.

(10) Patent No.: US 11,733,518 B2
(45) Date of Patent: Aug. 22, 2023

(54) HEAD-MOUNTED DISPLAY WITH LOW LIGHT OPERATION

(71) Applicant: Apple Inc., Cupertino, CA (US)

(72) Inventors: Killian J. Poore, Santa Clara, CA (US); Stephen E. Dey, San Francisco, CA (US); Trevor J. Ness, Santa Cruz, CA (US); Fletcher R. Rothkopf, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/856,080

(22) Filed: Apr. 23, 2020

(65) Prior Publication Data

US 2020/0341563 A1 Oct. 29, 2020

Related U.S. Application Data

(60) Provisional application No. 62/838,995, filed on Apr. 26, 2019.

(51) Int. Cl.
*G06F 3/0346* (2013.01)
*G02B 27/01* (2006.01)
(Continued)

(52) U.S. Cl.
CPC ....... *G02B 27/0172* (2013.01); *G06F 3/0346* (2013.01); *G06V 10/803* (2022.01); *G06V 20/20* (2022.01); *G02B 27/017* (2013.01)

(58) Field of Classification Search
USPC ........................................................ 345/158
See application file for complete search history.

(56) References Cited

U.S. PATENT DOCUMENTS 4,961,626 A 10/1990 Fournier, Jr. et al.
7,315,241 B1 1/2008 Daily et al.
(Continued)

FOREIGN PATENT DOCUMENTS

CN 104281429 A 1/2015
CN 105144022 A 12/2015
(Continued)

OTHER PUBLICATIONS

Livingston, Mark A., "Vision-based Tracking with Dynamic Structured Light for Video See-through Augmented Reality", 1998 <http://www.cs.unc.edu/Research/us/livingst/thesis.pdf> (145 pp).

*Primary Examiner* — Ifedayo B Iluyomade
(74) *Attorney, Agent, or Firm* — Young Basile Hanlon & MacFarlane, P.C.

(57) ABSTRACT

A display system includes a controller and a head-mounted display. The head-mounted display includes a display, a head support coupled to the display for supporting the display on a head of a user to be viewed by the user, and sensors coupled to the head support for sensing an environment from the head-mounted display unit in low light. The sensors include one or more of an infrared sensor for sensing the environment with infrared electromagnetic radiation, or a depth sensor for sensing distances to objects of the environment, and also include an ultrasonic sensor for sensing the environment with ultrasonic sound waves. The controller determines graphical content according to the sensing of the environment with the one or more of the infrared sensor or the depth sensor and with the ultrasonic sensor, and operates the display to provide the graphical content concurrent with the sensing of the environment.

27 Claims, 8 Drawing Sheets

(51) Int. Cl.
*G06V 10/80* (2022.01)
*G06V 20/20* (2022.01)

(56) References Cited

U.S. PATENT DOCUMENTS

| | | |
|---|---|---|
| 10,139,632 B2 | 11/2018 | Border et al. |
| 10,163,265 B2 | 12/2018 | Miller et al. |
| 11,249,310 B1 | 2/2022 | Kitain et al. |
| 2013/0127980 A1* | 5/2013 | Haddick ............... G06F 3/013 |
| | | 348/14.08 |
| 2016/0231573 A1 | 8/2016 | Mullins et al. |
| 2017/0202633 A1 | 7/2017 | Liu |
| 2017/0368994 A1 | 12/2017 | Gieseke et al. |
| 2018/0088323 A1* | 3/2018 | Bao ..................... G02B 27/017 |
| 2018/0113212 A1* | 4/2018 | Tachibana ............... G01S 15/32 |
| 2018/0270474 A1 | 9/2018 | Liu |

FOREIGN PATENT DOCUMENTS

| | | |
|---|---|---|
| CN | 105872520 A | 8/2016 |
| CN | 106464806 A | 2/2017 |
| CN | 109541812 A | 3/2019 |
| JP | 6345282 B2 | 6/2018 |

\* cited by examiner

HEAD-MOUNTED DISPLAY WITH LOW LIGHT OPERATION

CROSS-REFERENCE TO RELATED APPLICATION(S)

This application claims priority to and the benefit of U.S. Provisional Application No. 62/838,995, filed Apr. 26, 2019, the entire disclosure of which is incorporated by reference herein.

TECHNICAL FIELD

This disclosure relates to display systems and, in particular, head-mounted display units and operation thereof.

BACKGROUND

Human eyes have different sensitivity in different lighting conditions. Photopic vision is human vision with high levels of ambient light (e.g., luminance of approximately 10 to $10^8$ cd/m$^2$), such as daylight conditions. Photopic vision is provided by cone cells of the eye that provide sensitivity to different colors (i.e., wavelengths) of light. Scotopic vision is human vision with low levels of ambient light (e.g., luminance of approximately $10^{-6}$ to $10^{-3.5}$ cd/m$^2$), such as at night with overcast skies (e.g., with no moonlight). Scotopic vision is provided by rod cells of the eye. Mesopic vision is human vision with levels of ambient light between those for photopic vision and scotopic vision (e.g., luminance of approximately $10^{-3}$ to $10^{0.5}$ cd/m$^2$), such as at night without overcast skies (e.g., with moonlight) to early twilight times. Mesopic vision is provided by both the cone cells and the rod cells. As compared to photopic vision, scotopic vision or even mesopic vision may result in a loss of color vision, changing sensitivity to different wavelengths of light, reduced acuity, and more motion blur. Thus, in poorly lit conditions, such as when relying on scotopic vision, a person is less able to view the environment than in well lit conditions.

SUMMARY

Disclosed herein are implementations of display systems, including head-mounted display units and methods of providing content. In an implementation, a display system includes a controller and a head-mounted display unit. The head-mounted display unit includes a display, a head support coupled to the display for supporting the display on a head of a user to be viewed by the user, and sensors coupled to the head support for sensing an environment from the head-mounted display unit in low light. The sensors include one or more of an infrared sensor for sensing the environment with infrared electromagnetic radiation, or a depth sensor for detecting distances to objects of the environment, and also include an ultrasonic sensor for sensing the environment with ultrasonic sound waves. The controller determines graphical content according to the sensing of the environment with the one or more of the infrared sensor or the depth sensor and with the ultrasonic sensor, and operates the display to provide the graphical content concurrent with the sensing of the environment.

In an implementation, a display system includes a controller, and a head-mounted display unit. The head-mounted display unit includes a display for displaying graphical content to a user wearing the head-mounted display unit and sensors for sensing an environment from the head-mounted display unit. The sensors include an infrared sensor, a depth sensor, an ultrasonic sensor, and a visible light camera. In high light conditions, the sensors sense the environment to obtain first sensor data that is stored in a storage. The first sensor data includes first visible light sensor data obtained with the visible light camera and first non-visible light sensor data obtained from one or more of the infrared sensor, the depth sensor, or the ultrasonic sensor. In low light conditions after the first sensor data is stored, the sensors sense the environment to obtain current sensor data, and the controller determines the graphical content according to the current sensor data and first visible light sensor data.

In an implementation, a method of providing graphical content with a display system includes sensing an environment, processing sensor data, determining graphical content, and outputting the graphical content. The sensing includes sensing with sensors an environment to obtain sensor data in low light. The sensors are coupled to a head-mounted display unit of the display system and include an infrared sensor, a depth sensor, and an ultrasonic sensor. The processing includes processing the sensor data with a controller. The determining of the graphical content is performed with the controller according to the processing. The graphical content includes an ultrasonic graphical component and one or more of an infrared graphical component based on the sensor data obtained with the infrared sensor, a depth graphical component based on the sensor data obtained with the depth sensor, or a combined graphical component based on the sensor data obtained with both the infrared sensor and the depth sensor. The outputting of the graphical content is performed with a display of the head-mounted display unit.

DETAILED DESCRIPTION

Disclosed herein are embodiments of head-mounted display units that are configured for operating in low-light conditions, such as at night and/or when a user might otherwise use scotopic or mesopic vision to view the environment. More particularly, the head-mounted display units include one or more sensors configured to observe the environment and/or to detect objects in low-light conditions, which may include one or more of an infrared sensor, a depth sensor, and/or an ultrasound sensor. The head-mounted display unit provides content according to the sensors, which may include providing graphical content (e.g., displaying one or more of stored images, renderings of objects, graphical indicators).

Figure 1:
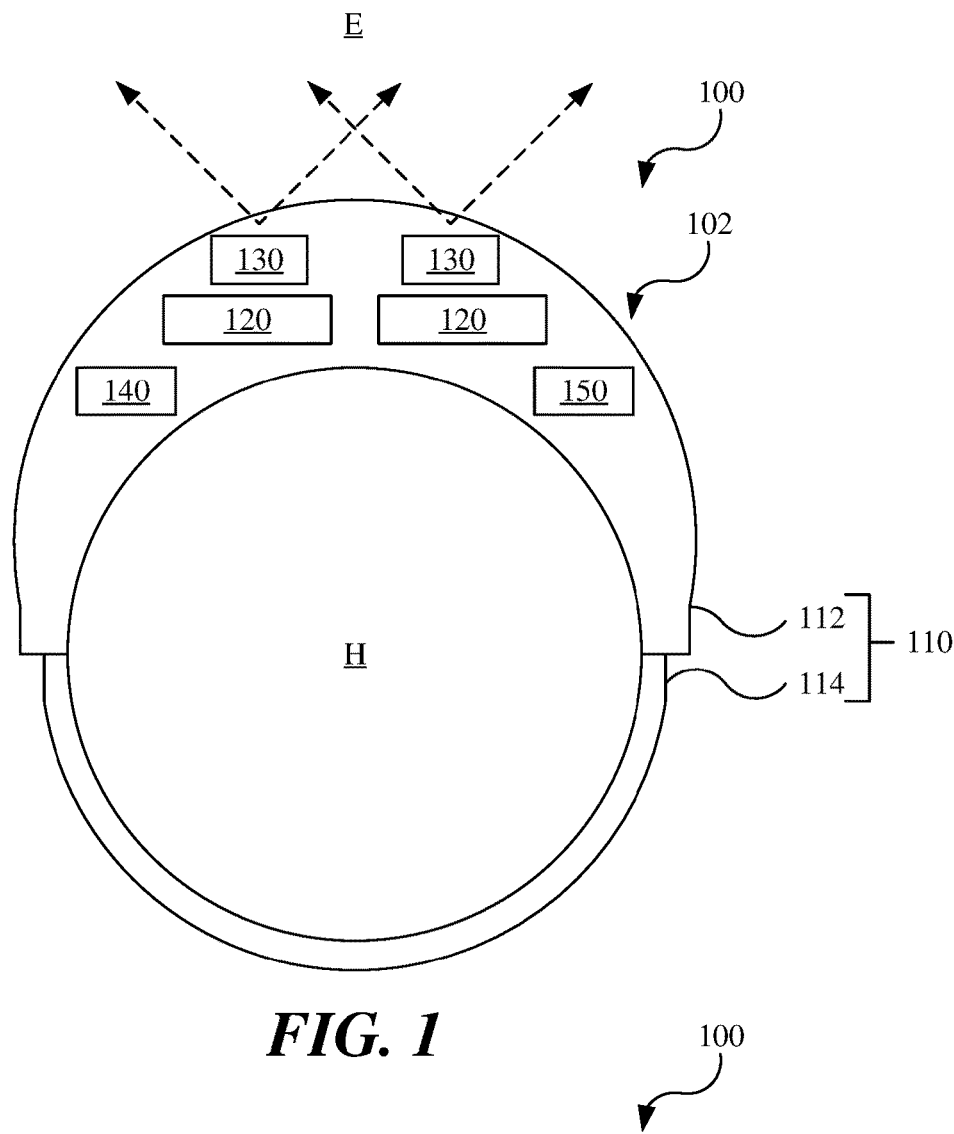
FIG. 1 is a top view of a head-mounted display unit on a head H of a user.
Figure 2:
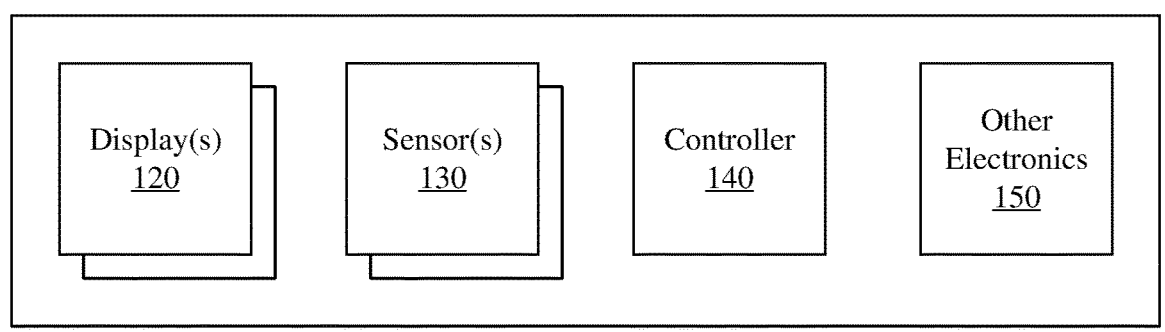
FIG. 2 is a schematic view of the head-mounted display unit.

Referring to FIGS. 1 and 2, a display system 100 includes a head-mounted display unit 102. The display system 100 may be configured to provide a computer generated reality, as discussed below. The display system 100 generally includes a head support 110, one or more displays 120, and one or more sensors 130 coupled the head support 110, which cooperatively form the head-mounted display unit 102. The head support 110 may, for example, include a chassis 112 and a head-engagement mechanism 114 coupled to the chassis 112. The one or more displays 120 and the one or more sensors 130 are coupled to the chassis 112, while the head-engagement mechanism 114 engages the head H of the user for supporting the displays 120 for displaying graphical content to eyes of the user. The one or more displays 120 may each be configured as a display panel (e.g., a liquid crystal display panel (LCD), light-emitting diode display panel (LED), organic light-emitting diode display panel (e.g., OLED)), or as a projector (e.g., that projects light onto a reflector back to the eyes of the user), and may further be considered to include any associated optical components (e.g., lenses or reflectors). The sensors 130 are configured to sense the environment and are discussed below with reference to FIG. 4.

The display system 100 further includes a controller 140 and other electronics 150. The controller 140 and the other electronics 150 may be coupled to the head-mounted display unit 102 (e.g., to the chassis), be provided separate from and operatively connectable to the head-mounted display unit 102 (e.g., wired or wirelessly to transfer signals and/or power therebetween), or be partially coupled to the head-mounted display unit 102 (e.g., with various components of the controller 140 and/or the electronics 150 being coupled to the head-mounted display unit 102 and other components thereof being operatively connectable thereto). The controller 140 controls various operations of the display system 100, for example, sensing various conditions with the sensors 130 and providing content with the display 120 according thereto. An example hardware configuration for the controller 140 is discussed below with reference to FIG. 3. The other electronics 150 may include, for example, power electronics (e.g., a battery), communications devices (e.g., modems and/or radios for communicating wirelessly with other devices), and/or other output devices (e.g., speakers for aural output, haptic devices for tactile output).

Figure 3:
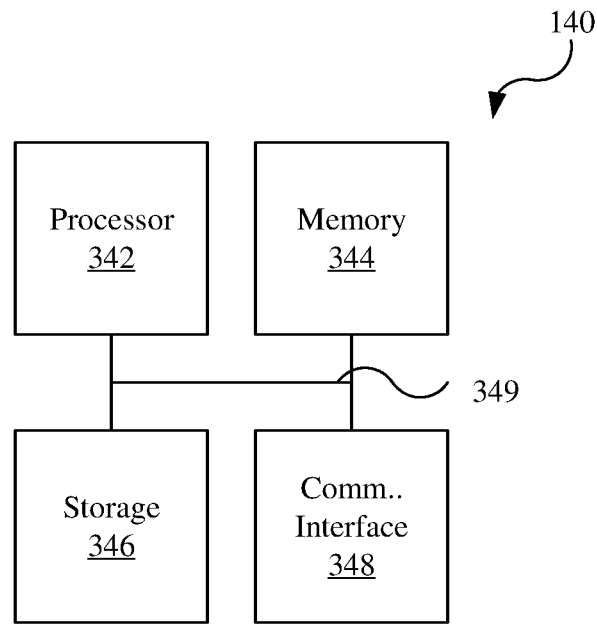
FIG. 3 is a schematic view of an example hardware configuration of a controller of the head-mounted display unit.

Referring to FIG. 3, the controller 140 is a computing device configured to implement the systems and methods described herein. The controller 140 generally includes a processor 342, a memory 344, a storage 346, a communications interface 348, and a bus 349 allowing communication therebetween. The processor 342 may be any suitable processor, such as a central processing unit (CPU) configured to execute instructions. The memory 344 is a short-term volatile memory (e.g., random access memory module). The storage 346 is a long-term, non-volatile memory that stores software programming containing the instructions executed by the processor 342 (e.g., a hard disk or solid-state drive). The communications interface 348 sends and receives signals from and to the controller 140, such as from and to other electronic components of the display system 100 (e.g., the displays 120, the sensors 130, and/or the other electronics 150). While the controller 140 is illustrated as a singular device, various of the components thereof may be provided in any suitable manner, and the controller 140 may include fewer and/or more components. For example, the controller 140 may be considered to include processing devices or other electronic hardware particularly associated with each of the sensors.

Figure 4:
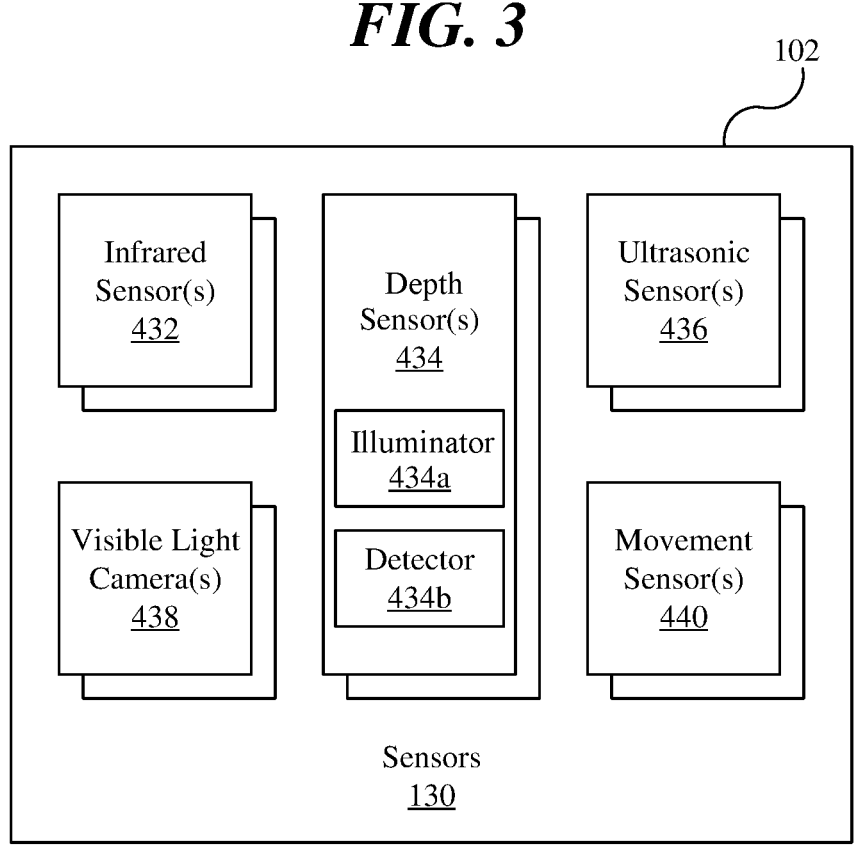
FIG. 4 is a schematic view of sensors of the head-mounted display unit.

Referring to FIG. 4, the sensors 130 include one or more infrared sensors 432, one or more depth camera sensors 434, and/or one or more ultrasonic sensors 436, which face outward from the head-mounted display unit 102 to observe the environment E. The sensors 130 also include one or more visible light cameras 438 that face outward from the head-mounted display unit 102 to observe the environment, as well as one or more movement sensors 440 that detects the position, orientation, and/or movement of the head-mounted display unit 102.

The infrared sensor 432 detects infrared light in the environment. The infrared sensor 432 may be any suitable type of infrared sensor for detecting electromagnetic radiation in the infrared frequency ranges. In one example, the infrared sensor 432 is an infrared camera, which captures images (e.g., video) in the infrared frequency ranges using an image sensor, such as a charge-coupled device (CCD) or complementary metal-oxide-semiconductor (CMOS) sensor, and other suitable hardware components (e.g., an image processor). Images captured by the infrared sensor 432 may be referred to as IR images. The infrared sensor 432 may be a passive sensor that observes infrared radiation emitted or reflected by objects in the environment. Alternatively, the infrared sensor 432 may include an infrared illuminator, which emits electromagnetic radiation in the infrared frequency range to thereby illuminate the environment and objects therein.

Information about the environment obtained and/or derived from (e.g., after processing) the infrared sensor 432 may be referred to as infrared sensor data 552. As discussed in further detail below, the infrared sensor data 552 may be processed, stored, and/or used to determine graphical content in different manners.

The depth sensor 434 detects the environment and, in particular, detects the depth (e.g., distance) therefrom to objects of the environment. The depth sensor 434 generally includes an illuminator 434a and a detector 434b. The illuminator 434a emits electromagnetic radiation (e.g., infrared light) from the head-mounted display unit 102 into the environment. The detector 434b observes the electromagnetic radiation reflected off objects in the environment. In two specific examples, the depth sensor 434 is a depth camera that uses structured light or time of flight. In the case of the depth sensor 434 being a structured light sensor, the illuminator 434a projects a pattern of electromagnetic radiation in the infrared frequency ranges (e.g., a grid or array of infrared dots, such as tens of thousands of dots), while the detector 434b is a camera that captures images of the pattern of the infrared light as reflected by objects in the environment, which may be referred to as structured light images. The structured light images are then analyzed (e.g., by the controller 140) to determine the depth (e.g., distances) from the depth sensor 434 to the objects of the environment (or points thereon), for example, by analyzing deformation of the light pattern as reflected off the objects. The detector 434b may be a camera that includes an image sensor, such as a charge-coupled device (CCD) or complementary metal-oxide-semiconductor (CMOS) sensor, and other suitable hardware components (e.g., an image processor). In the case of the depth sensor 434 being a time-of-flight camera, the illuminator 434a projects electromagnetic radiation, while the detector 434b is a suitable camera according to which the time of flight is measured of the electromagnetic radiation emitted from the illuminator 434a as reflected off the object to determine distances thereto. The depth sensor 434 may operate in different frequency ranges of the electromagnetic radiation spectrum than the infrared sensor 432, so as to not detect or otherwise be sensitive to electromagnetic radiation of the other (e.g., using appropriate filters, camera image sensors, and/or illuminators and the projector 434a in suitable frequency ranges). In other examples, the depth sensor 434 may be a radar detection and ranging sensor (RADAR) or a light detection and ranging sensor (LIDAR). It should be noted that one or multiple types of depth sensors 434 may be utilized, for example, incorporating one or more of a structured light sensor, a time-of-flight camera, a RADAR sensor, and/or a LIDAR sensor. In one preferred embodiment, the depth sensors 434 include only the structured light sensor.

Information about the environment obtained and/or derived from (e.g., after processing) the depth sensor 434 may be referred to as depth sensor data 554. As discussed in further detail below, the depth sensor data 554 may be processed, stored, and/or used to determine graphical content in different manners.

The ultrasonic sensor 436 detects the environment using ultrasonic sound waves. The ultrasonic sensor 436 may, for example, include an ultrasonic transmitter that transmits ultrasonic sound waves and an ultrasonic receiver that detects those ultrasonic sound waves reflected by physical objects in the environment, or may alternatively use an include an ultrasonic transceiver that performs the function of both the ultrasonic transmitter and the ultrasonic receiver. The ultrasonic sound waves are then processed, such as by the controller 140 or another suitable processor, to identify and/or locate features of an environment. Advantageously, the ultrasonic sensor 436 may detect objects that are otherwise not observable with the infrared sensors 432 and/or the depth sensor 434, such as a sheet of glass (e.g., of a window or door).

Information about the environment obtained and/or derived from (e.g., after processing) the ultrasonic sensor 436 may be referred to as ultrasonic sensor data 556. As discussed in further detail below, the ultrasonic sensor data 556 may be processed, stored, and/or used to determine graphical content in different manners.

The one or more visible light cameras 438 detects visible light in the environment. The visible light cameras 438 includes an image sensor, such as a charge-coupled device (CCD) or complementary metal-oxide-semiconductor (CMOS) sensor, and other suitable hardware components (e.g., an image processor) and optical components (e.g., lenses).

Information about the environment obtained and/or derived from (e.g., after processing) the visible light camera 438 may be referred to as visible light sensor data 558. The visible light sensor data 558 may include images (e.g., video), which may be referred as visible light images. As discussed in further detail below, the visible light sensor data 558 may be processed, stored, and/or used to determine graphical content in different manners.

One or multiple (e.g., two) of each of the infrared sensors 432, the depth sensors 434, the ultrasonic sensor 436, and/or the visible light camera 438 may be coupled to the head-mounted display unit 102, for example, to sense the environment E stereoscopically from the head-mounted display unit 102. The one or more infrared sensors 432, the depth sensors 434, the ultrasonic sensor 436, and/or the visible light camera 438 may provide the same or different fields of view as each other, which are generally represented in FIG. 1 by the dashed arrows emanating from the sensors 130. In the systems and processes discussed below, the various types of sensors are referred to singularly, though it should be understood that the systems and processes may be applied to multiple such sensors (e.g., to determine and provide graphical content stereoscopically).

The one or more movement sensors 440 detects the position, orientation, and/or movement of the head-mounted display unit 102. The one or more movement sensors 440 may, for example, include a global positioning system sensor (e.g., GPS), one or more accelerometers, one or more gyroscopes, and/or an inertial measurement unit (IMU), which function to determine the position, orientation, and/or movement of the head-mounted display unit 102.

Information obtained and/or derived from (e.g., after processing) the movement sensor 440 may be referred to as movement sensor data 560. As discussed in further detail below, the movement sensor data 560 may be processed, stored, and/or used to determine graphical content in different manners.

Figure 5:
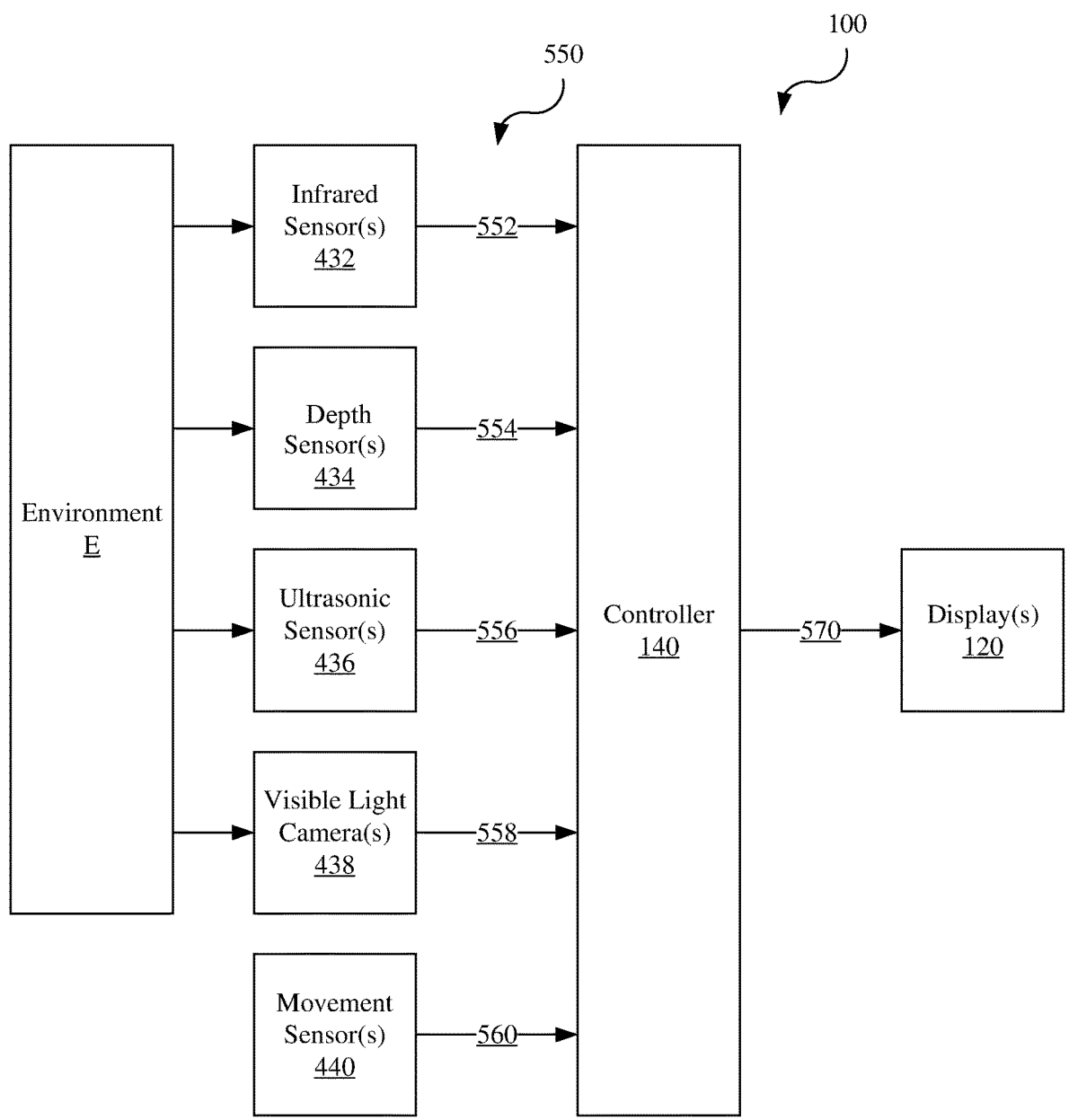
FIG. 5 is a block diagram of a display system.

Referring to FIG. 5, the display system 100 outputs graphical content to the user, which enhances the user's ability to see in low light conditions. Low light conditions may be defined, for example, according to ambient light conditions (e.g., luminance less than $10^{-3.5}$ cd/m$^2$) and/or the type of vision that the human would otherwise use to directly observe the environment (e.g., when scotopic vision is predominantly or substantially only used by the human). The graphical content may, for example, include images that enhance contrast between objects of the environment, renderings of detected objects or other indicators, and/or captured images. Renderings are computer-generated graphical reproductions of the detected objects, which are generated according to sensor information. Renderings may be accurate reproductions that accurately depicted the detected object (e.g., with corresponding textures, colors, sizes, etc.), may be characterized reproductions that may alter various features of the detected object (e.g., changing to a "cartoon" form with uniform and/or different colors, different textures, contrasting outlines), or may be a highlighting rendering (e.g., overlaying an object). As an illustrative and non-limiting example of a characterized reproduction, a wood table may have an accurate reproduction that depicts the varied color and graining of the wood and shading to emphasize different surfaces, or a characterized reproduction that depicts a uniform color and black outlines between surfaces. A highlighting rendering, for example, might include highlighting the table in green by providing a colored translucent outline over other graphical content of the table. Renderings may be of the environment (e.g., objects or structures that define an environment, such as walls of a room) or objects within the environment.

The infrared sensor 432, the depth sensor 434, the ultrasonic sensor 436, and the visible light camera 438 sense the environment E from the head-mounted display unit 102, while the movement sensor 440 senses the position, orientation, and/or movement of the head-mounted display unit 102 on the head of the user. The sensor data, including the infrared sensor data 552, the depth sensor data 554, the ultrasonic sensor data 556, the visible light sensor data 558, and/or the movement sensor data 560, is sent from the respective sensors to the controller 140 with one or more sensor signals 550.

The controller 140 receives the sensor signals 550, processes the sensor data received thereby, determines the graphical content according to the sensor data, and in turn sends one or more signals to the display 120, which may be referred to as a display signal 570. The display 120 receives the display signal 570 and outputs the graphical content. As referenced above, the controller 140 may include one or more local or distributed processing devices, which process the sensor data and/or determine the graphical content, such as processors that may be associated with the different sensors 130. The processing and/or determining may, however, be performed by different processors and/or different controllers.

Figure 6:
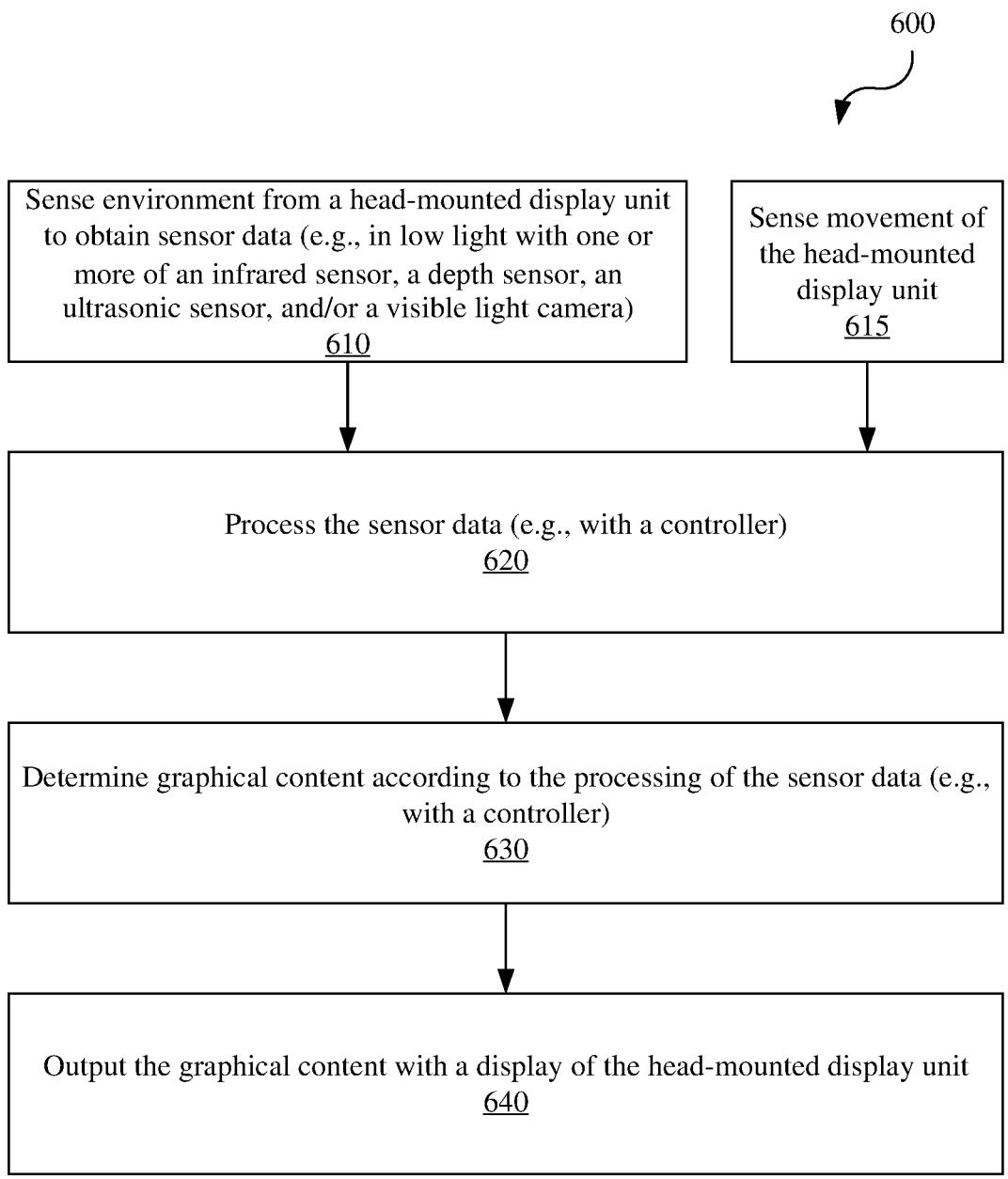
FIG. 6 is a flowchart of a process for providing graphical content with the display system of FIG. 5.

Referring to FIG. 6, a process 600 provides graphical content with a display system that includes a head-mounted display unit, such as the display system 100 and the head-mounted display unit 102. The process 600 generally includes sensing 610 the environment in low light with sensors to generate sensor data, processing 620 the sensor data, determining 630 graphical content, and outputting 640 the graphical content. The process 600 may also include another operation 615 of sensing movement of the head-mounted display unit.

The sensing 610 of the environment to generate the sensor data is performed with sensors, such as the sensors 130, which face outward from the head-mounted display unit, such as the head-mounted display unit 102. The sensors include, for example, one or more of the infrared sensor 432, the depth sensor 434, the ultrasonic sensor 436, and/or the visible light camera 438. The sensor data, such as the infrared sensor data 552, the depth sensor data 554, the ultrasonic sensor data 556, the visible light sensor data 558, and/or the movement sensor data 560, is sent to a processor, such as the processor 342 of the controller 140, via one or more signals, such as the sensor signal 550. Different combinations of sensor data may be obtained and/or sent. For example, the visible light camera 448 and/or the movement sensors 450 may omitted and/or not operated.

The processing 620 of the sensor data is performed with a processor, for example, with the processor 342 of the controller 140 and/or other processing devices particularly associated with one or more of the sensors (e.g., an image processor associated with a camera). Processing the sensor data may be performed in various manners as discussed in further detail below with respect to the systems and processes in FIGS. 7-12.

The determining 630 of the graphical content is performed, for example, with a processor, such as the processor 342 of the controller 140 and/or other processing devices particularly associated with the display 120. Determining the graphical content may be performed in various manners as discussed in further detail below with respect to the systems and processes in FIGS. 7-12. The processing 620 and the determining 630 may be performed as a singular operation, for example, when simply converting infrared light into visible light. The graphical content is sent, for example, via the display signal 570.

The outputting 640 (e.g., display) of the graphical content is performed by one or more displays, such as the display 120, according to the display signal 570 received from the controller 140. The outputting 640 is performed substantially concurrent with the sensing 610, such that the graphical content is displayed concurrent (e.g., in real-time) with the environment sensed by the head-mounted display. Concurrent or substantially concurrent should be understood to account for latency of the display system 100 associated with sensing, processing, determining, and/or transmitting operations.

The sensing 610, the processing 620, the determining 630, and the outputting 640 are repeated, so as to provide the user with the graphical content as a stream of images (e.g., a video stream).

Figure 7:
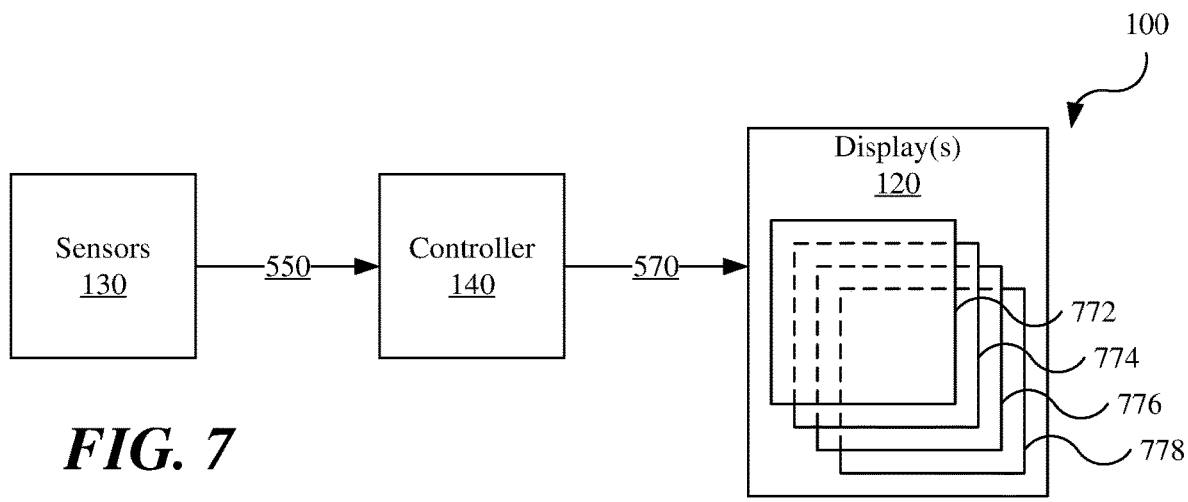
FIG. 7 is a block diagram of a display system.
Figure 8:
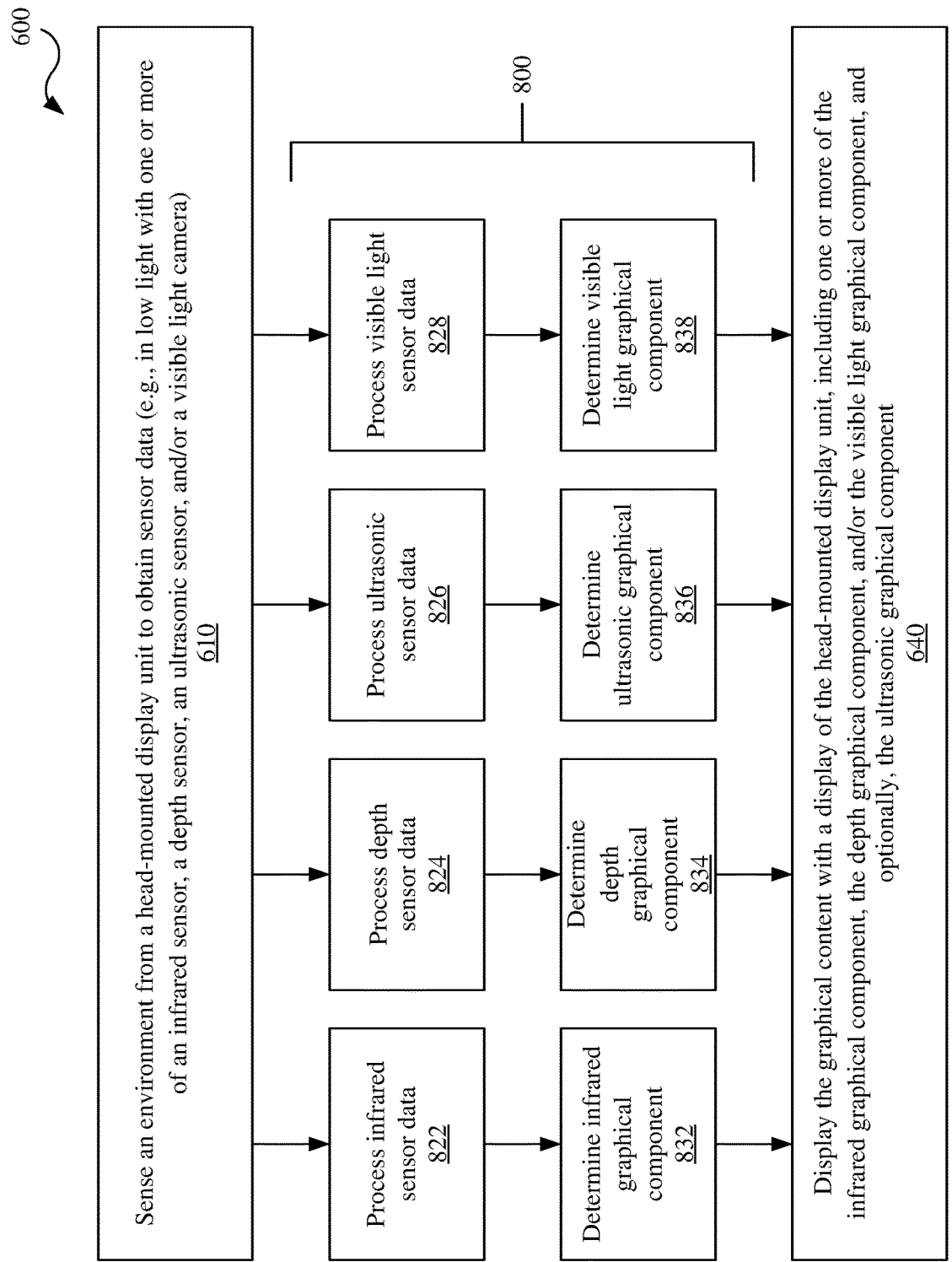
FIG. 8 is a flowchart of a process for determining graphical content with the display system of FIG. 7.

Referring to FIGS. 7 and 8, the display system 100 processes the sensor data from each of the sensors independent of each other and may further determine graphical content components independent of each other. For example, the display system 100 may display graphical content that includes an infrared graphical component 772 based on the infrared sensor data 552 from the infrared sensor 432, a depth graphical component 774 based on the depth sensor data 554 from the depth sensor 434, an ultrasonic graphical component 776 based on the ultrasonic sensor data 556 from the ultrasonic sensor 436, and/or a visible light graphical component 778 based on the visible light sensor data 558 from the visible light camera 438. The infrared graphical component 772, the depth graphical component 774, the ultrasonic graphical component 776, and/or the visible light graphical component 778 may be displayed simultaneously and concurrent with detection of the associated information, for example, being overlaid each other with suitable transparency for viewing of each of the components. The graphical content is displayed substantially concurrent with the sensing thereof, such that the user may observe the environment in real time via the graphical content. Aural content may also be provided (e.g., output by speakers of the other electronics 350), for example, based on the ultrasonic graphical component 776 based on the ultrasonic sensor data 556 from the ultrasonic sensor 436 to indicate distance to an object.

The infrared sensor data 552, such as the IR images captured with the infrared sensor 432, may be processed in various manners for determining the graphical content. In one example, the infrared sensor data 552 is processed to convert the infrared images from infrared light to visible light that forms the infrared graphical component 772. Instead or additionally, the infrared sensor data 552 is processed to enhance contrast of the infrared images. Instead or additionally, the infrared sensor data 552 is processed to detect objects of the environment using, for example, suitable computer vision or other object detection programming or algorithms. Detecting may include locating, characterizing, and/or identifying objects, or other object recognition functions related to the environment. Locating generally refers to determining a position of objects or features thereof in a real coordinate system and/or relative to the head-mounted display unit 102. Characterizing generally refers to determining characteristics of the physical object, such as size, shape, and/or color. Identifying generally refers to identifying a type of object (e.g., a door, wall, chair) or uniquely identifying a particular object (e.g., a door in a certain room of a certain house).

The infrared graphical component 772 of the graphical content may, for example, include the IR image converted to visible light and/or with enhanced. Instead or additionally, the infrared graphical component 772 may include other graphics, such as renderings generated according to the infrared sensor data 552.

The depth sensor data 554, such as the structured light images captured with the depth sensor 434, may be processed in various manners for determining the graphical content and, in particular, to determine distances from the depth sensor 434 on the head-mounted display unit 102 to locations (e.g., points) on objects of the environment. Such distances may be represented by a depth map, which is a mathematical and/or visual representation of such distances.

The depth map, or other information derived from the depth sensor 434, may be further processed (e.g., analyzed) to detect (e.g., locate, characterize, and/or identify) objects in the environment. The depth map, or other depth information, may also be processed to determine the relative position, orientation, and/or movement of the head-mounted display unit 102 relative to the environment and/or the relative position, orientation, and/or movement of objects of the environment.

The depth graphical component 774 of the graphical content may, for example, include the structured light images. Instead or additionally, the depth graphical component 774 includes renderings determined (e.g., generated) according to the depth sensor data 554, such as a rendering of the depth map itself, renderings of the environment, renderings of objects therein, and/or renderings to highlight detected objects.

The ultrasonic sensor data 556 detected with the ultrasonic sensor 436 is processed to determine the graphical or other content output by the head-mounted display unit 102. In particular, the ultrasonic sensor data 556 is processed to detect (e.g., locate, characterize, and/or identify) objects of the environment, such as by determining a distance from the head-mounted display unit 102 (e.g., the ultrasonic sensor 436 thereof) from the objects of the environment and/or relative movement therebetween.

The ultrasonic graphical component 776 of the graphical content may, for example, include a graphical representation of a distance to the detected object or a graphical representation of the detected object (e.g., a glass panel or wall). The ultrasonic graphical component 776 of the graphical content may instead include another graphical indicator, such as numerical or color indicator that indicates distance to the object. Instead or additionally, an aural ultrasonic indicator may be provided, such as a verbal indicator or sound indicator for indicating type and/or distance to the object.

The visible light sensor data 558 (e.g., the visible light images) detected with the visible light camera 438 may be processed in various manners for determining the graphical content. In one example, the visible images may be processed in a suitable manner for display to the user. Instead or additionally, the visible images may be processed to enhance contrast. Instead or additionally, the visible light sensor data is processed to detect (e.g., locate, characterize, and/or identify) physical objects of the environment, which may include physical features of an environment and/or physical objects of the environment, such as with object-recognition programming (e.g., computer vision software).

The visible light graphical component 778 of the graphical content may, for example, include visible light images and/or renderings determined according to the visible light information, such as renderings of the environment and/or renderings of objects therein. The visible light graphical component 778 may also be omitted in low light conditions.

Upon determining the graphical content, the controller 140 causes the display 120 to output the graphical content. For example, as described above, the controller 140 sends the display signal 570 to the display 120. The display signal 570 may include each component of the graphical content, such as the infrared graphical component 772, the depth graphical component 774, the ultrasonic graphical component 776, and/or the visible light graphical component 778, which may form a combined or parallel streams of data sent to the display 120. As noted above, various of the graphical components may be omitted, for example, the visible light graphical component 778 may be omitted in low light conditions.

Referring to FIG. 8, a process 800 is provided for processing the sensor data and determining the graphical content according thereto, which may be performed as part of the method 600 as the processing 620 the sensor data and the determining 630 the graphical content according thereto. Thus, the process 800 be preceded and succeeded by the sensing 610 of the environment and the outputting 640 of the graphical content. The process 800 generally includes processing operations 822, 824, 826, and/or 828 for processing the infrared sensor data 552, the depth sensor data 554, the ultrasonic sensor data 556, and the visible light sensor data 558, respectively. The process 800 also generally includes graphical content determining operations 832, 834, 836, and 838 for determining the infrared graphical component 572, the depth graphical component 574, the ultrasonic graphical component 576, and the visible light graphical component 578, respectively. The process 800 may, for example, be performed in low light conditions.

The processing 822 of the infrared sensor data 552 is performed with a processor, such as the processor 342 of the controller 140. As described above with respect to FIG. 7, the infrared sensor data 552 may be processed to convert the infrared sensor data 552 to visible light, enhance contrast, and/or to detect (e.g., locate, characterize, and/or identify) objects of the environment.

The determining 832 of the infrared graphical component 772 is performed with a processor, such as the processor 342 of the controller 140, according to the processing 822 of the infrared sensor data 552. As described above, the infrared graphical component 772 may include visible light images converted from the infrared images, images with enhanced contrast, and/or renderings of or associated with detected objects. The infrared graphical component 772 is subsequently sent to the display 120 for output thereby, such as being sent via the display signal 570.

The processing 824 of the depth sensor data 554 is performed with a processor, such as the processor 342 of the controller 140. As described above with respect to FIG. 7, the depth sensor data 554 may be processed, for example, to generate a depth map, to detect (e.g., locate, characterize, and/or identify) objects in the environment, and/or to determine the relative position, orientation, and/or movement of the head-mounted display unit 102 relative to the environment and/or the relative position, orientation, and/or movement of objects of the environment.

The determining 834 of the depth graphical component 774 is performed with a processor, such as the processor 342 of the controller 140, according to the processing of the depth sensor data 554. As described above the depth graphical component 774 may include structured light images, a rendering of the depth map, and/or renderings of or associated with detected objects. The depth graphical component 874 is subsequently sent to the display 120 for output thereby, such as being sent via the display signal 570.

The processing 826 of the ultrasonic sensor data 556 is performed with a processor, such as the processor 342 of the controller 140. As described above with respect to FIG. 7, the ultrasonic sensor data 556 may be processed, for example, to detect (e.g., locate, characterize, and/or identify) objects of the environment.

The determining 836 of ultrasonic graphical component 776 is performed with a processor, such as the processor 342 of the controller 140, according to the processing of the ultrasonic sensor data 556. As described above the ultrasonic graphical content may include a graphical representation of a detected object (e.g., a wall or glass panel) and/or an alphanumeric and/or color indicator of a distance from the head-mounted display unit 102 (e.g., the ultrasonic sensor 436) and the object. The ultrasonic graphical component 776 is subsequently sent to the display 120 for output thereby, such as being sent via the display signal 570.

The processing 828 of the visible light sensor data 558 is performed with a processor, such as the processor 342 of the controller 140. As described above with respect to FIG. 7, the visible light sensor data 558 may be processed, for example, to enhance contrast and/or locate and/or characterize objects of the environment.

The determining 838 of the visible light graphical component 778 is performed with a processor, such as the processor 342 of the controller 140, according to the processing of the visible light sensor data 558. As described above, the visible light graphical component 778 may include visible light images, images with enhanced contrast, and/or renderings of objects of the environment. The visible light graphical component 778 is subsequently sent to the display 120 for output thereby, such as being sent via the display signal 570.

In determining each component of the graphical content, layering and/or transparency may also be determined. For example, the ultrasonic graphical component 776 may be highly transparent and overlaid the other graphical components.

Figure 9:
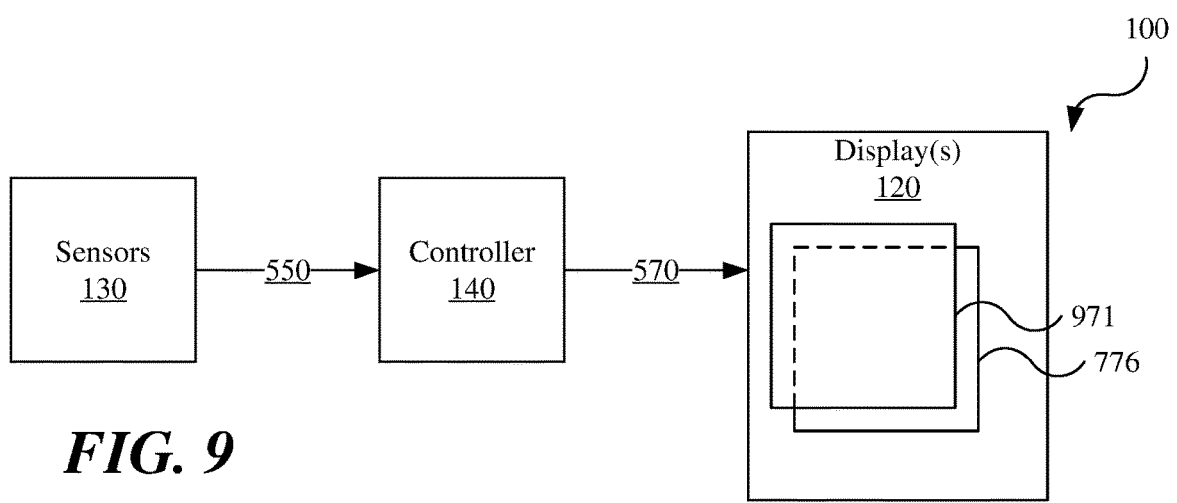
FIG. 9 is a block diagram of a display system.
Figure 10:
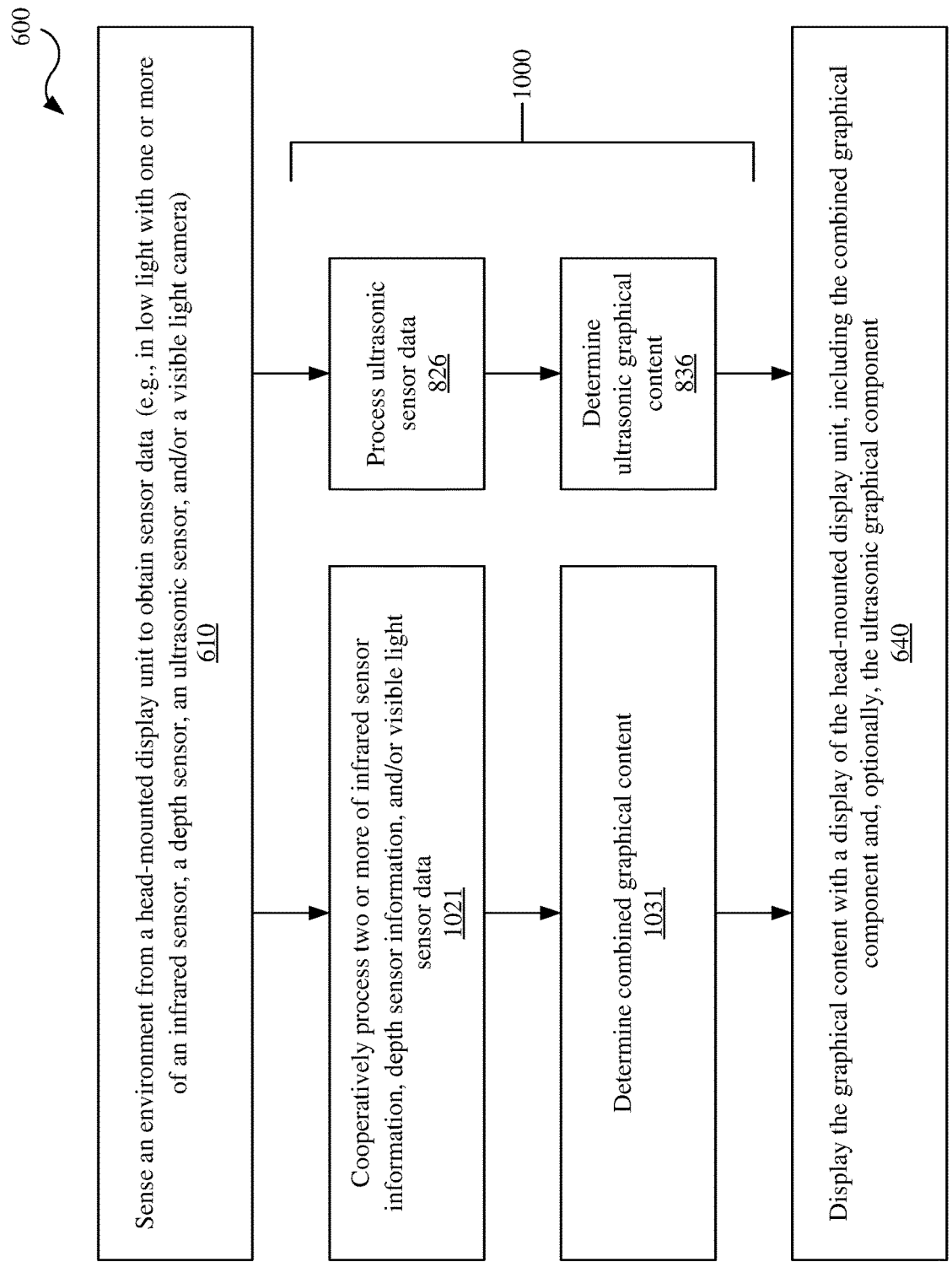
FIG. 10 is a flowchart of another process for determining graphical content with the display system of FIG. 9.

Referring to FIGS. 9 and 10, the display system 100 processes the sensor data from two or more of the sensors cooperatively with each other and may further determine graphical content components cooperatively with each other. For example, the display system 100 may display graphical content that includes a combined graphical component 971, which may be based on a combination of the infrared sensor data 552, the depth sensor data 554, and/or the visible light sensor data 558. The display system 100 may simultaneously display the ultrasonic graphical component 776, which is based on the ultrasonic sensor data 556, and the combined graphical component 971, for example, with the ultrasonic graphical component 776 being overlaid therewith.

The infrared sensor data 552, the depth sensor data 554, and/or the visible light sensor data 558 may be cooperatively processed in any suitable manner. For example, the infrared sensor data 552, the depth sensor data 554, and the visible light sensor data 558 may first be independently processed, such as to detect (e.g., locate, characterize, and/or identify) objects of the environment (e.g., using computer vision or other suitable object detection programming) and/or generate a depth map in the case of the depth sensor data 554. The location, characterization, and/or identity of the objects of the environment, as determined independently, may subsequently be cooperatively processed, such as according to a suitable sensor fusion algorithm, to provide more accurate and/or more complete data than might be obtainable from the sensors individually. In another example, the infrared images, the depth map, and the visible light images may be processed in a cooperative manner (e.g., sensor fusion algorithms) and subsequently assessed to detect (e.g., locate, identify, and/or characterize) objects of the environment. In one specific example, the infrared sensor data 552 and the depth sensor data 554 are cooperatively processed without the visible light sensor data 558.

Based on the cooperative processing of the infrared sensor data 552, the depth sensor data 554, and/or the visible light sensor data 558, the combined graphical component 971 is determined. For example, the combined graphical component 971 may include renderings of the objects of the environment. The combined graphical component 971 is subsequently sent to the display 120 for output thereby, such as being sent via the display signal 570.

The ultrasonic sensor data 556 may be processed and the ultrasonic graphical component 776 determined in the manners described previously.

Referring to FIG. 10, a process 1000 is provided for processing the sensor data and determining the graphical content according thereto, which may be performed as part of the process 600 as the processing 620 of the sensor data and the determining 630 of the graphical content according thereto. Thus, the process 1000 may be preceded and succeeded by the sensing 610 of the environment and the outputting 640 of the graphical content. The process 1000 generally includes combined processing 1021 of the sensor data and determining 1031 the combined graphical content according thereto. The process 1000 may, optionally, also include the processing 826 the ultrasonic sensor data 556 and the determining 836 of the ultrasonic graphical component 776 according thereto, as were described previously. The process 1000 may, additionally, though not shown, include the independent processing 822, 824, 828 and determining 832, 834, 838 associated with one or more of the infrared sensor data 552, the depth sensor data 554, and/or the visible light sensor data 558. The process 1000 may, for example, be performed in low light conditions.

The combined processing 1021 of two or more of the infrared sensor data 552, the depth sensor data 554, and/or the visible light sensor data 558 is performed with a processor, such as the processor 342 of the controller 140. As described above with respect to FIG. 9, the combined processing 1021 includes processing two or more of the infrared sensor data 552, the depth sensor data 554, and/or the visible light sensor data 558 in a cooperative manner, such as with a sensor fusion algorithm.

The determining 1031 of the combined graphical component 971 is performed with a processor, such as the processor 342 of the controller 140, according to the combined graphical data. As described above with the respect to FIG. 9, the combined graphical component 971 may include renderings of the objects of the environment.

The ultrasonic sensor data 556 may be processed and the ultrasonic graphical component 776 determined in the manners described previously.

Figure 11:
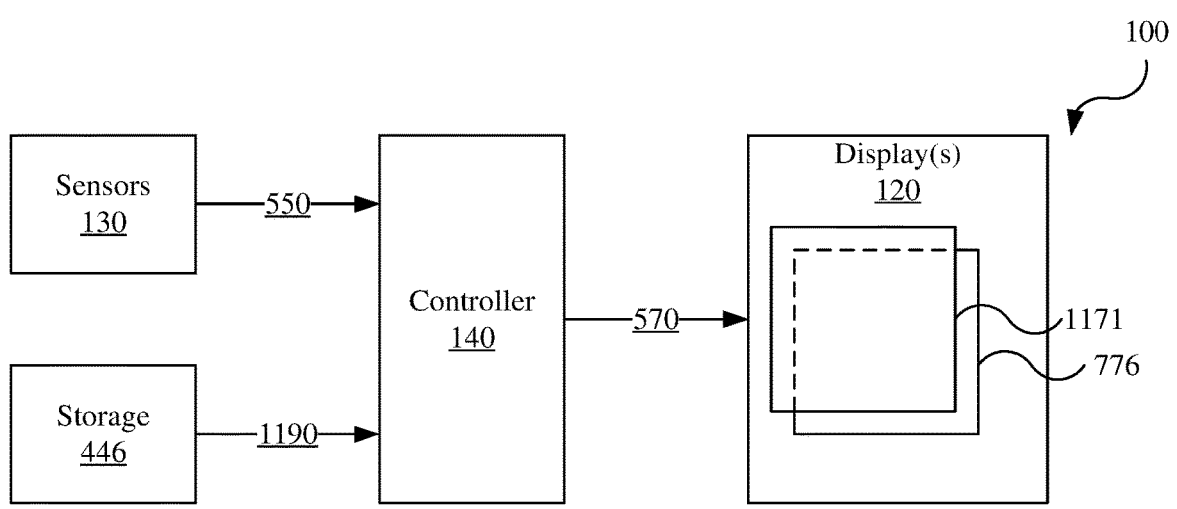
FIG. 11 is a block diagram of a display system.
Figure 12:
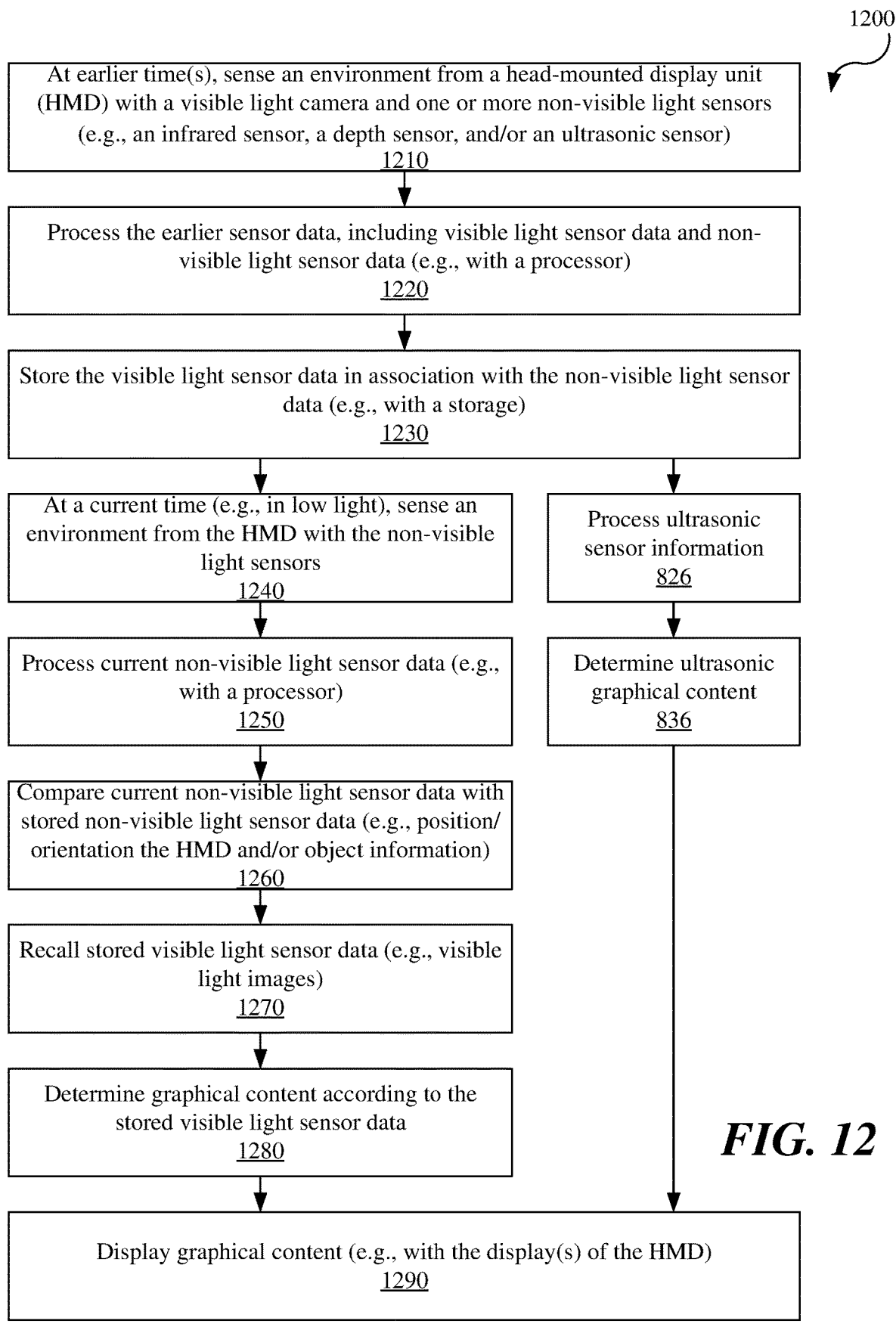
FIG. 12 is a flowchart of another process for providing graphical content with the display system of FIG. 11.

Referring to FIGS. 11 and 12, the display system 100 senses the environment E and stores the sensor data and later determines the graphical content according the sensor data stored previously. The display system 100 may store the visible light sensor data 558 captured in high light conditions in the environment (the high light being ambient light having luminance above 10 cd/m^2) and later, in low light conditions, determine graphical content according to the stored visible light sensor data 558, for example, displaying the visible light images, portions thereof, and/or renderings derived therefrom. For example, visible light images may be captured and stored when a user had previously moved through an environment.

At one or more earlier times (e.g., a first time) in high light conditions, the display system 100 senses the environment with the sensors 130, including the visible light camera 438 and one or more of the infrared sensor 432, the depth sensor 434, the ultrasonic sensor 436, and/or the movement sensor 440. The visible light sensor data 558 is stored in association with the infrared sensor data 552, the depth sensor data 554, the ultrasonic sensor data 556, and/or the movement sensor data 560 captured concurrently therewith.

The visible light sensor data 558 may stored in a generally unprocessed format (e.g., as raw images) and/or after processing, such as being formatted for later display and/or object recognition of the environment and/or objects therein (e.g., to locate, characterize, and/or identify such objects or features thereof).

The other sensor data, including one or more of the infrared sensor data 552, the depth sensor data 554, the ultrasonic sensor data 556, and/or the movement sensor data 560 may be processed and stored in association the visible light sensor data 558 detected concurrently therewith. The infrared sensor data 552, the depth sensor data 554, the ultrasonic sensor data 556, and/or the movement sensor data 560 may be processed and stored individually and/or in a combined manner (e.g., as described previously in the processes 800 and 1000, such as using sensor fusion). In one particular example, the infrared sensor data 552, the depth sensor data 554, the ultrasonic sensor data 556, and/or the movement sensor data 560 are processed to determine location information (e.g., position and/or orientation) of the head-mounted display unit 102 that is associated with the visible light sensor data 558 and/or the other sensor data (e.g., the infrared sensor data 552, the depth sensor data 554, the ultrasonic sensor data 556, and/or the movement sensor data 560). In other examples, the location, characteristics, and/or identity of the objects and/or features of the environment are stored, which may be referred to as object information.

At one or more subsequent times (e.g., a current time) in low light conditions, the display system 100 senses the environment with the one or more of the infrared sensor 432, the depth sensor 434, and/or the ultrasonic sensor 436, and/or the movement sensor 440 senses the position, orientation, and/or movement of the head-mounted display unit 102. The sensor data (e.g., the infrared sensor data 552, the depth sensor data 554, the ultrasonic sensor data 556, and/or the movement sensor data 560) is processed and compared to the sensor data from the earlier times, for example, being processed in the same or similar manner as at the earlier times (e.g., individually and/or cooperatively) for suitable comparison thereto. Based on the comparison, the visible light sensor data 558 may be recalled and the graphical content determined, at least in part, according thereto. In one specific example, current location information is compared to stored location information to recall the visible light sensor data 558 associated with the stored location information that matches or otherwise favorably compares to the current location. In other examples, the object information from the current time may be compared to the object information from previous times to recall the visible light sensor data 558.

Referring to FIG. 12, a process 1200 provides graphical content with display system that includes a head-mounted display unit, such as the display system 100 and the head-mounted display unit 102. The process 1200 generally includes sensing 1210 the environment with sensors at earlier times, processing 1220 the sensor data from the earlier times, storing 1230 the earlier sensor data, sensing 1240 the environment with the sensors at a current time, processing 1250 the sensor data from the current time, comparing 1260 the current sensor data to the earlier sensor data, recalling 1270 the earlier visible light sensor data, determining 1280 the graphical content according to the earlier visible light sensor data, and outputting 1290 the graphical content at the current time. Portions of the process 1200 may be performed in high light conditions (e.g., the sensing 1210), while other portions of the process 1200 are performed in low light conditions (e.g., the sensing 1240 to the outputting 1290) and repeated to provide continual content to the user.

The sensing 1210 at the earlier times is performed with the sensors 130 and may be performed as described previously for the sensing 610 of the process 600. The sensing 1210 is performed at earlier times and in high light conditions.

The processing 1220 is performed with a processor, such as the processor 342 of the controller 140, and may include parallel operations for processing the visible light sensor data 558 and the other sensor data (i.e., non-visible light sensor data including the infrared sensor data 552, the depth sensor data 554, the ultrasonic sensor data 556, and/or the movement sensor data 560). The processing 1220 of the visible light sensor data 558 may performed as described previously, for example, with the processing 828 of the visible light sensor data 558 in the process 800. The processing 1220 of the non-visible light sensor data may be performed independently for the different types of sensor data (e.g., with the processing 822, 824, and/or 826 in the process 800) and/or performed cooperatively (e.g., with the processing 1021 in the process 1000).

The storing 1230 is performed with a storage, such as the storage 346 of the controller 140 or other suitable storage. The storing 1230 includes storing the visible light sensor data 558 (before and/or after processing), such as the visible light images, in and/or for association with the non-visible light sensor data (before and/or after processing). The visible light sensor data 558 that is stored may be referred to as stored visible light sensor data. The non-visible light sensor data that is stored may be referred to as stored non-visible light sensor data, which may include location and/or object information. The stored visible light sensor data and the stored non-visible light sensor data is stored in and/or for association with each other, such that the stored visible light sensor data may be recalled by identifying the stored non-visible light sensor data associated therewith. For example, the visible light sensor data 558 may be stored in a common location (e.g., database) in association with the non-visible light sensor data and/or in in different location (e.g., different databases) with common metadata (e.g., time stamp) suitable for association and recall.

The sensing 1240 for the current time is performed with sensors, such as the infrared sensor 432, the depth sensor 434, the ultrasonic sensor 436, and/or the movement sensor 440. The sensing 1240 may also include sensing with the visible light camera 438.

The processing 1250 of the sensor data therefrom (e.g., the infrared sensor data 552, the depth sensor data 554, the ultrasonic sensor data 556, the visible light camera 438, and/or the movement sensor data 560) is performed with a processor, such as the processor 342 of the controller 140. The processing 1250 may be performed in the same or similar manner as with the processing 1220 described previously, such that the current non-visible sensor data may be compared to the stored non-visible sensor data.

The comparing 1260 of the current non-visible sensor data with the stored non-visible sensor data is performed with a processor, such as the processor 342 of the controller 140.

The recalling 1270 of the stored visible light sensor data 558 is performed with a processor, such as the processor 342 of the controller 140, and a storage, such as the storage 346 of the controller 140. For example, upon matching or favorable comparison (e.g., nearest) of the current non-visible light sensor data to the stored non-visible light sensor data, the visible light sensor data 558 associated with the stored non-visible light sensor data is recalled (e.g., retrieved from the storage).

The determining 1280 of the graphical content is performed with a processor, such as the processor 342 of the controller 140. The graphical content includes at least one of the visible light graphical component 778 and/or a combined component 1279, each of which are determined according to the stored visible light sensor data 558 that was recalled in the recalling 1270. For example, the graphical content may include visible light images, visible light images with enhanced contrast or portions thereof, or renderings otherwise derived from the stored visible light sensor data 558. The graphical content may include other individual or combined components, as described previously.

The process 1200 may, optionally, also include the processing 826 the ultrasonic sensor data 556 and the determining 836 of the ultrasonic graphical component 776 according thereto, as were described previously.

The outputting 1290 of the graphical content is performed with the displays 120, for example, according to display signals 570 received from processor (e.g., the controller 140) and including the graphical content.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to provide graphical content to users based on the current physical environment. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver graphical content to a user, which relates to current and past movement of the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, providing graphical content, the present technology can be configured to allow users to select to "opt in" or "opt out" of participation in the collection of personal information data during registration for services or anytime thereafter. In another example, users can select not to store sensor data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, graphical content may be based on non-personal information data or a bare minimum amount of personal information, such as using current sensor data to provide the graphical content.

What is claimed is:

1. A display system comprising:
    a controller; and
    a head-mounted display unit having a display, a head support coupled to the display for supporting the display on a head of a user to be viewed by the user, and low light sensors coupled to the head support for sensing an environment from the head-mounted display unit in low light, the sensors comprising:
    an infrared sensor for sensing the environment with infrared electromagnetic radiation;
    a depth sensor for sensing distances to physical objects in the environment; and
    an ultrasonic sensor that transmits ultrasonic waves and detects the ultrasonic waves reflected by physical objects in the environment for sensing the physical objects in the environment;
    wherein the controller determines graphical content including a rendering of the environment, the rendering determined according to the sensing of the environment with the infrared sensor, the depth sensor, and the ultrasonic sensor, and operates the display to provide the graphical content concurrent with the sensing of the environment.

2. The display system according to claim 1, wherein the graphical content includes a stored visible light image or a rendering of another object detected by the one or more of the infrared sensor or the depth sensor.

3. The display system according to claim 1, wherein the rendering includes an infrared graphical component determined according to the infrared sensor, a depth graphical component determined according to the depth sensor, and an ultrasonic graphical component determined according to the ultrasonic sensor.

4. The display system according to claim 3, wherein the infrared graphical component, the depth graphical component, and the ultrasonic graphical component are determined independent of each other.

5. The display system according to claim 1, wherein the rendering includes a combined graphical component determined cooperatively according to sensing of the environment with the infrared sensor, the ultrasonic sensor, and the depth sensor.

6. The display system according to claim 5, further comprising a visible light camera coupled to the head-mounted display unit for sensing the environment with visible light in high light prior to the sensing the environment in the low light, wherein visible light sensor data obtained from the visible light camera is stored with a storage of the display system; and
    wherein the controller determines the combined graphical component according to the visible light sensor data in the storage.

7. The display system according to claim 3, wherein the depth sensor is a structured light sensor that senses the environment with structured light.

8. The display system according to claim 1, further comprising a visible light camera coupled to the head-mounted display unit for sensing the environment with visible light in high light prior to the sensing the environment in the low light, wherein visible light sensor data obtained from the visible light camera is stored with a storage of the display system; and
    wherein the controller determines the graphical content according to the visible light sensor data in the storage.

9. The display system according to claim 8, wherein the visible light sensor data includes visible light images, and the graphical content includes the visible light images.

10. The display system according to claim 8, wherein sensor data obtained from the infrared sensor, the depth sensor, and the ultrasonic sensor in high light is stored in association with the visible light sensor data obtained concurrent therewith.

11. The display system according to claim 1, wherein the low light is ambient light having luminance below approximately $10^{-3.5}$ cd/m$^2$.

12. A display system comprising:
    a controller; and
    a head-mounted display unit having a display for displaying graphical content to a user wearing the head-mounted display unit and sensors for sensing an environment from the head-mounted display unit, the sensors including a visible light camera and a movement sensor;
    wherein in high light conditions, visible light images of the environment are obtained by the visible light camera, information describing a position and orientation of the head-mounted display unit is obtained by the movement sensor, and the visible light images are stored in storage in association with the information describing the position and orientation of the head-mounted display unit; and
    wherein in low light conditions, a current position and orientation of the head-mounted display unit is obtained from the movement sensor, the visible light images are recalled from the storage according to a comparison of the current position and orientation of the head-mounted display unit to the information describing the position and orientation of the head-mounted display unit that is stored in association with the visible light images, the controller determines the graphical content that includes a rendering of the environment based on the visible light images recalled from the storage, and outputs the graphical content using the display.

13. The display system according to claim 12, wherein the controller determines the graphical content to include the visible light images.

14. The display system according to claim 12, wherein the controller compares the current position and orientation of the head-mounted display unit to a previous position and orientation of the head-mounted display unit obtained in high light conditions, recalls the visible light images according to the comparison, and determines the graphical content according to the recalling of the visible light images.

15. The display system according to claim 12, wherein the current position and orientation of the head-mounted display unit matches the previous position and orientation of the head-mounted display unit.

16. A method of providing graphical content with a display system, comprising:
   sensing an environment with sensors coupled to a head-mounted display unit to obtain sensor data in low light, the sensors including an infrared sensor, a depth sensor, and an ultrasonic sensor that transmits ultrasonic waves to the environment and detects the ultrasonic waves reflected by physical objects in the environment for sensing the physical objects;
   determining a rendering of the environment that includes an ultrasonic graphical component based on the sensor data obtained with the ultrasonic sensor, an infrared graphical component based on the sensor data obtained with the infrared sensor, and a depth graphical component based on the sensor data obtained with the depth sensor; and
   outputting the rendering of the environment with a display of the head-mounted display unit.

17. The method according to claim 16, wherein the rendering of the environment further includes stored images of the objects that were previously obtained in high light.

18. The method according to claim 16, further comprising:
   comparing, by the controller, the sensor data with stored sensor data obtained with the sensors in high light, and recalling visible light images of the stored sensor data;
   wherein the rendering of the environment further includes the visible light images.

19. The method according to claim 16, wherein determining the rendering of the environment includes independently processing the sensor data obtained from the infrared sensor, the depth sensor, and the ultrasonic sensor;
   wherein determining the graphical content includes determining the infrared graphical component, the depth graphical component, and the ultrasonic graphical component; and
   wherein outputting the graphical content includes displaying the infrared graphical component, the depth graphical component, and the ultrasonic graphical component simultaneously.

20. The method according to claim 16, wherein determining the rendering of the environment includes cooperatively processing the sensor data obtained from the infrared sensor and the depth sensor and independently processing the sensor data obtained from the ultrasonic sensor;
   wherein determining the graphical content includes determining a combined graphical component according to the cooperative processing and determining an ultrasonic graphical component according to the independent processing; and
   wherein outputting the graphical content includes displaying the combined graphical component and the ultrasonic graphical component simultaneously.

21. The method according to claim 16, wherein the depth sensor is a structured light sensor.

22. The display system according to claim 1, wherein the graphical content includes one or more of a graphical indicator of a distance to one of the physical objects or a graphical representation of one of the physical objects.

23. The display system according to claim 22, wherein the one or more of the graphical indicator or the graphical representation is of one of the physical objects that is not observable with the one or more of the infrared sensor or the depth sensor.

24. The display system according to claim 1, wherein the rendering includes a highlighting rendering.

25. The display system according to claim 1, wherein the rendering includes providing a colored translucent outline over the graphical content.

26. The display system according to claim 1, wherein the rendering includes an accurate reproduction that accurately depicts the physical objects.

27. The display system according to claim 19, wherein the infrared graphical component, the depth graphical component, and the ultrasonic graphical component are displayed concurrent with determination and are overlaid with each other with suitable transparency for viewing each of the components.

* * * * *